(12) United States Patent
Seki et al.

(10) Patent No.: US 7,464,261 B2
(45) Date of Patent: Dec. 9, 2008

(54) SWITCHING DEVICE, SWITCHING METHOD AND COMPUTER SYSTEM CAPABLE OF PREVENTING ERROR IN DATA TRANSMISSION, WHICH IS EASY TO USE

(75) Inventors: Fujio Seki, Tokyo (JP); Heiichi Sugino, Tokyo (JP); Mitsuaki Nakazawa, Tokyo (JP); Keiji Miyatsu, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 630 days.

(21) Appl. No.: 09/878,336

(22) Filed: Jun. 12, 2001

(65) Prior Publication Data

US 2002/0066031 A1    May 30, 2002

(30) Foreign Application Priority Data

Nov. 30, 2000    (JP) ............................. 2000-365809

(51) Int. Cl.
*H04L 9/00* (2006.01)
*H04K 1/00* (2006.01)
*G06F 3/02* (2006.01)

(52) U.S. Cl. .................. 713/150; 380/255; 710/37
(58) Field of Classification Search ......... 715/716–718, 715/733–737, 750, 751, 778; 380/257–258, 380/42, 30, 255; 713/150, 1, 100, 189, 200, 713/201; 710/73
See application file for complete search history.

(56) References Cited

U.S. PATENT DOCUMENTS

| | | | |
|---|---|---|---|
| 4,484,025 A * | 11/1984 | Ostermann et al. .......... 280/279 |
| 5,159,632 A * | 10/1992 | Crandall ...................... 380/28 |
| 5,432,850 A * | 7/1995 | Rothenberg .................. 713/162 |
| 5,675,653 A * | 10/1997 | Nelson, Jr. ................... 380/28 |
| 5,721,842 A * | 2/1998 | Beasley et al. .............. 709/204 |
| 6,256,014 B1 * | 7/2001 | Thomas et al. .............. 345/163 |
| 6,388,658 B1 * | 5/2002 | Ahern et al. ................ 345/168 |
| 6,473,811 B1 * | 10/2002 | Onsen ......................... 710/15 |
| 6,557,170 B1 * | 4/2003 | Wilder et al. ............... 725/130 |
| 6,671,756 B1 * | 12/2003 | Thomas et al. ............... 710/73 |
| 7,039,810 B1 * | 5/2006 | Nichols ....................... 713/182 |
| 2002/0129098 A1 * | 9/2002 | Stone et al. ................. 709/203 |

FOREIGN PATENT DOCUMENTS

JP    6-149439    5/1994

OTHER PUBLICATIONS

Bruce Schneier, "Applied Cryptography", second edition, 1996, p. 10.*
Dictionary.com/encipher, last visited:Mar. 17, 2006, pp. 1-3.*

* cited by examiner

*Primary Examiner*—Kimyen Vu
*Assistant Examiner*—Ponnoreay Pich
(74) *Attorney, Agent, or Firm*—Staas & Halsey LLP

(57) ABSTRACT

A switching device for controlling a connection between a private computer, a shared computer, and a terminal, including: a connecting unit that connects each terminal to a corresponding private computer in a default status, and switches a connection destination of the terminal to a private computer corresponding to the terminal or the shared computer when a connection switching request transmitted from the terminal has been received; and a security unit that executes for each terminal, identification processing on the data that has been received from any one terminal and output to the at least one private computer or the shared computer.

6 Claims, 12 Drawing Sheets

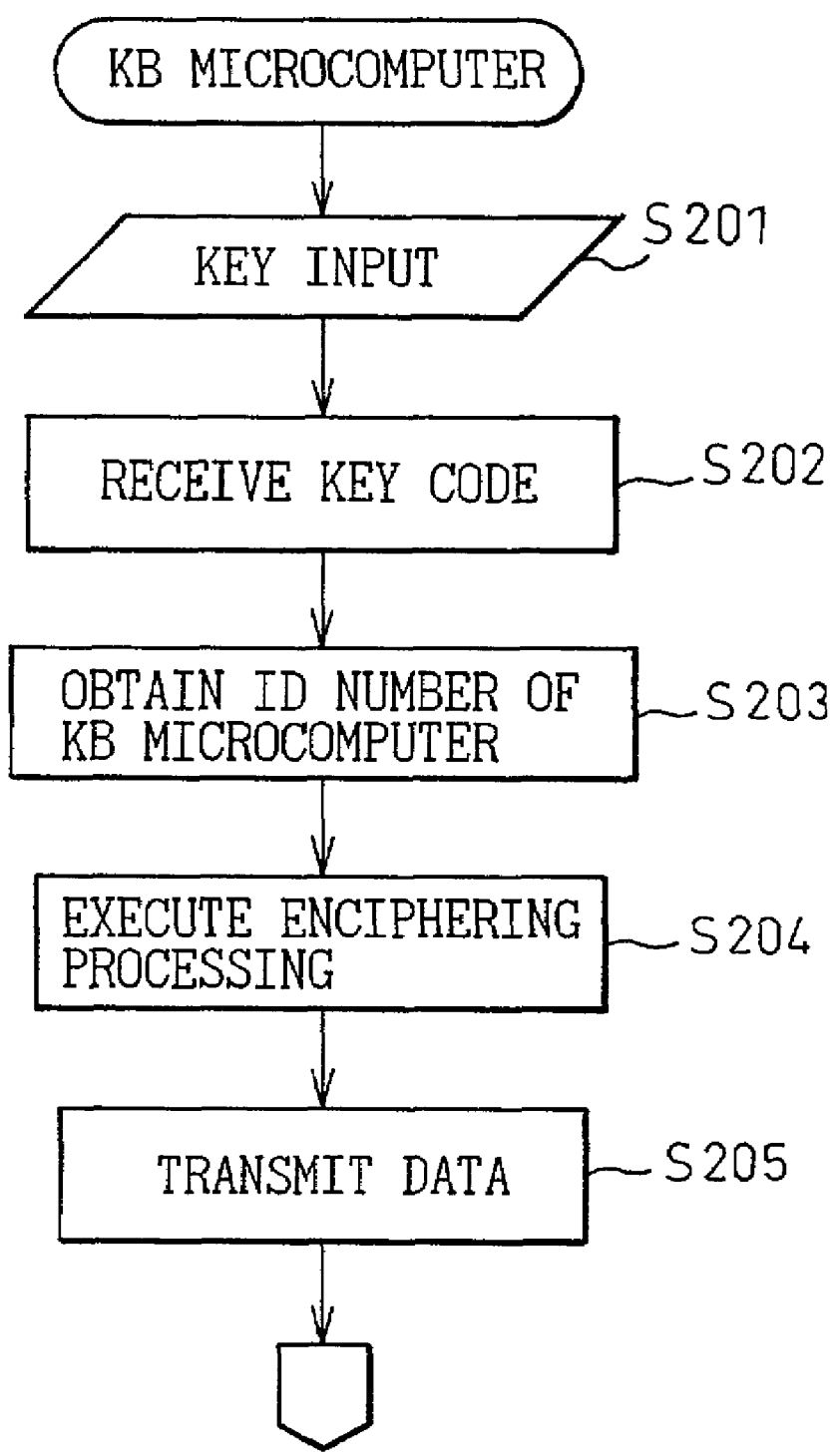

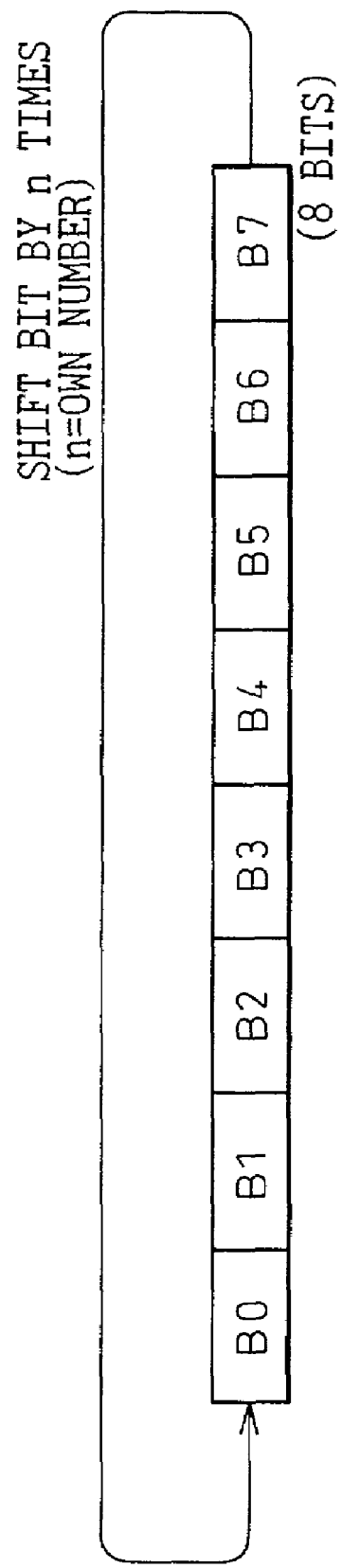

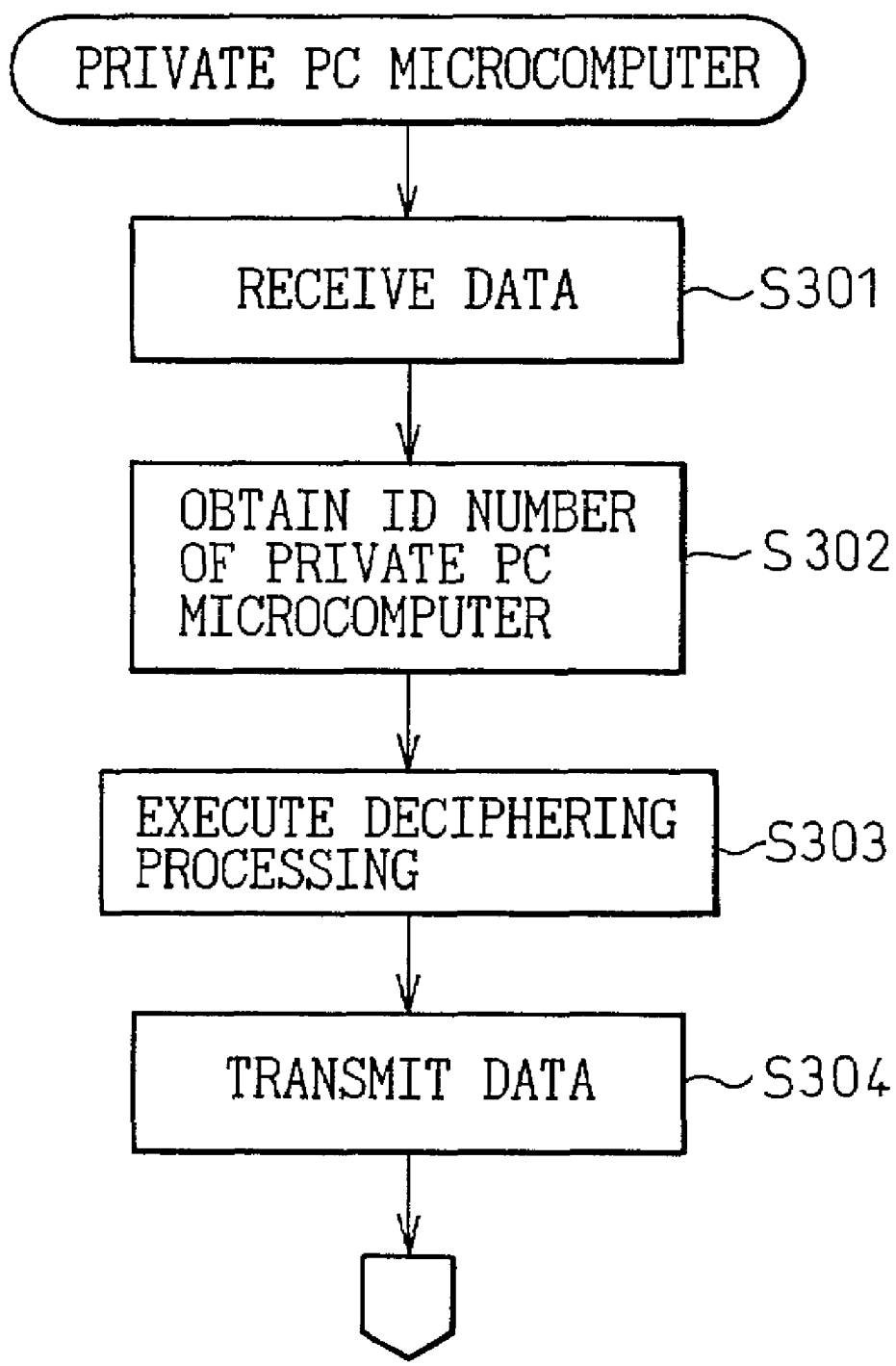

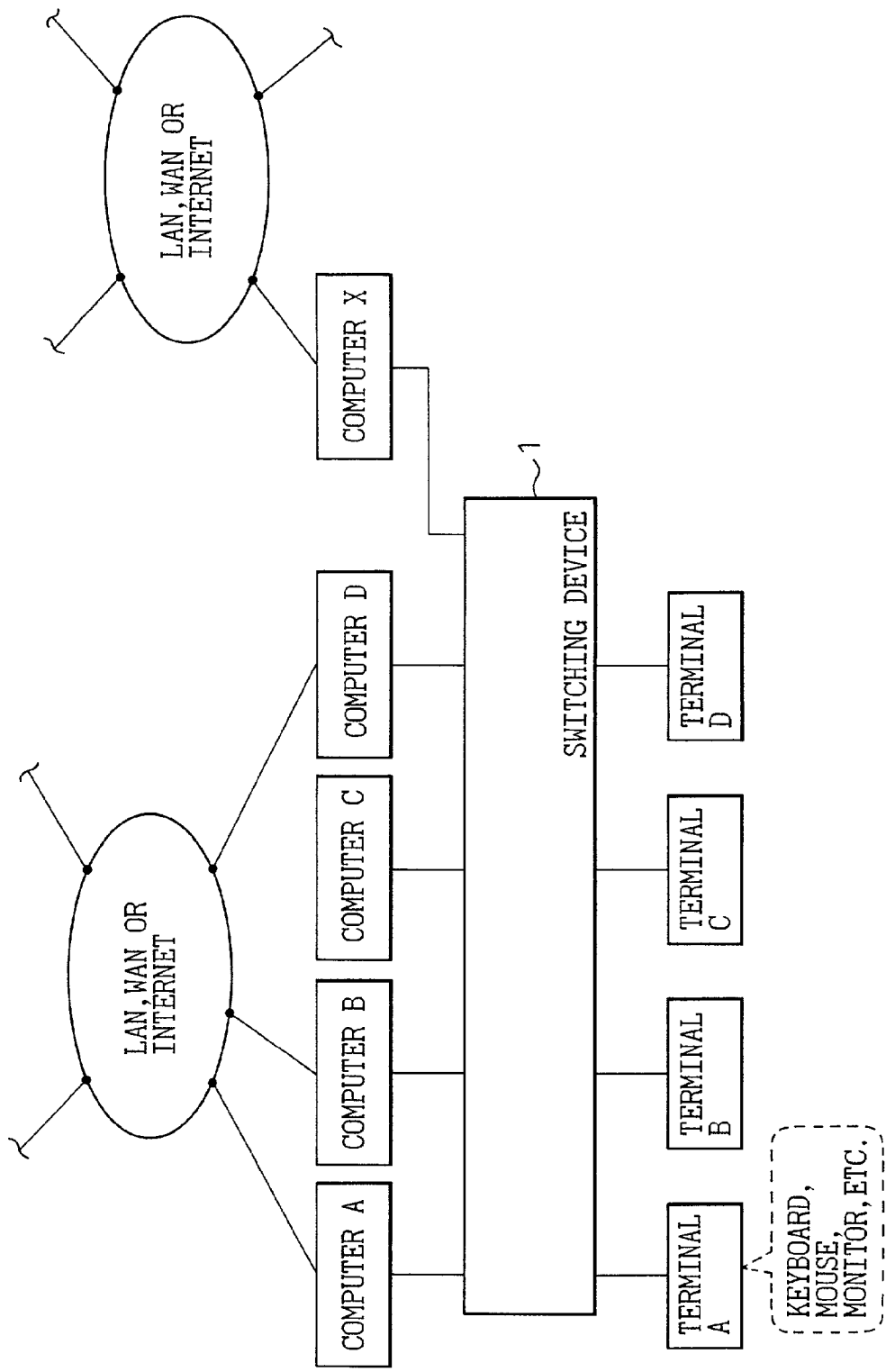

SWITCHING DEVICE, SWITCHING METHOD AND COMPUTER SYSTEM CAPABLE OF PREVENTING ERROR IN DATA TRANSMISSION, WHICH IS EASY TO USE

BACKGROUND OF THE INVENTION

1. Field of the Invention

The present invention relates to a switching device and a switching method for switching between a plurality of computers and terminals, and a computer system including this switching device. Particularly, the invention relates to a switching device and a switching method for controlling a connection between at least one private computer, at least one terminal corresponding to this private computer, and a shared computer operated by the terminal, and a computer system including this switching device.

2. Description of the Related Art

Along with rapid progress in the processing performance of computers, the computers have come to be widely used. Particularly, in recent years, the computers have been extensively used for electronic commercial transactions and in applications, including browsing of homepages and transmission and reception of electronic mail, based on the connection between the computers and an external network as represented by the Internet. Further, a plurality of computers are being used on a network like a LAN (Local Area Network) that has been built up within each enterprise or within an educational organization, for example, to thereby increase the convenience. In this case, it is generally true that a computer is installed for each user to be exclusively used by each user in order to cope with work or the work objects of each user.

However, when a computer is connected to an external network like the Internet, this involves a risk that there occurs an unintended loss of data due to an erroneous operation of the computer by the user.

In light of the above problem, there is a case where a private computer is prepared separately from a computer (hereinafter to be referred to as a "network computer") that is connected to the Internet, for example. Namely, a user uses the private computer for work that does not require the Internet or for work that is particularly important, and the user uses the network computer for work that requires the Internet. In this way, the user differentiates the use of the computers according to the contents of work and the importance of work. Further, as an example of this extensive application, there is a case where private computers are connected to an intranet as a network within an enterprise.

Therefore, in light of the above problems, it is an object of the present invention to provide a switching device for controlling switching of a connection between at least one terminal and a plurality of computers, wherein the switching device is capable of preventing an erroneous transfer of data, which is easy to use, and a switching method therefor.

However, according to the above conventional examples, they have a problem in that the work efficiency is lowered as each user is forced to move between the private computer and the network computer.

There is one example of a method of avoiding a user's need for moving between the computers. According to this method, a private computer and a network computer are prepared for each user so that the user can operate the private computer and the network computer using one terminal (that is, a keyboard and a pointing device). According to this case, the private computer and the network computer are connected to the terminal via a switch respectively. The switch controls switching of a connection between the terminal and a plurality of computers. Each user can operate this switch to change the connection between the terminal and the computers.

However, according to this conventional method, as the private computer and the network computer are prepared for each user, this method is disadvantageous in the installation cost and the installation space.

To avoid the above problem, there is an example of a method according to which a set of a terminal and a private computer corresponding to this terminal is provided for each user, and a network computer is shared among a plurality of users. Based on this arrangement, a connection between each terminal and each computer is relayed via a switch.

However, according to this conventional method, when a changeover switch is provided in the switch main body, each user must move to the switch to carry out a switch operation. Even when a user can carry out a switch operation from the keyboard as one terminal, the user needs to depress a plurality of keys on the keyboard. Therefore, this method has had a problem of poor operability.

Further, this method involves risks that it is not possible to realize a correct switching of connections and that an unintentional data outflow occurs due to a trouble in the switch main body within the switching device or due to an erroneous operation of the switch by the user.

Therefore, in the light of the above problems, it is an object of the present invention to provide a switching device for controlling the switching of a connection between at least one terminal and a plurality of computers, the switching device capable of preventing an erroneous transfer of data, which is easy to use, and a switching method therefor.

Further, it is another object of the present invention to provide a computer system including at least one terminal, a plurality of computers, a switching device for controlling the switching of a connection between the terminal and the computers, and a network to which at least one of the plurality of computers is connected, the computer system capable of preventing an erroneous transfer of data where the switching device is easy to use.

SUMMARY OF THE INVENTION

In order to achieve the above objects, according to one aspect of the present invention, there is provided a switching device that controls a connection between at least one private computer, at least one terminal corresponding to the private computer, and a shared computer that can be operated by the terminal, the switching device including: contacting unit that connects each terminal to a corresponding private computer in a default status, and that switches a connection destination of the terminal to a private computer corresponding to the terminal or the shared computer when a connection switching request transmitted from the terminal has been received; and security unit that executes, for each terminal, an identification process for the data that has been received from any one terminal and output to the private computer or the shared computer.

Further, according to another aspect of the present invention, there is provided a computer system including: at least one private computer; a terminal corresponding to the private computer; at least one shared computer connected to a network; and a switching device disposed between the private computer and the terminal, for relaying data between the terminal and the shared computer.

According to the present invention, in a switching device for relaying data between a terminal of each user, a computer corresponding to this terminal, and a certain specified computer, even when a switch main body within the switching device is out of order, it is possible to prevent data from flowing out, based on a security processing realized by a microcomputer provided within the switching device. Therefore, security of a high level is obtained.

According to the switching processing of the switching device in the present invention, a user can easily carry out a switching operation by depressing a predetermined key on the keyboard of the terminal. Further, a connection status of the switching device is displayed as a flicker of a LED exclusive to the predetermined key of each terminal. Therefore, it is not necessary to provide new display unit, and it is easy to visually confirm the connection status.

Further, when the switching device of the present invention is used for relaying data between computers connected to the network as represented by the Internet or an intranet, it is easy to differentiate the use of the computers by operating the switching device. Moreover, even when a switch main body within the switching device is out of order, and important data has passed out to the Internet in error, a key code has not been correctly deciphered as described above. Therefore, incorrectly deciphered information does not flow out. As a result, the information is very safe, so that this method is useful. For example, according to the conventional example, security has been obtained by preparing a private computer and a network computer for each user. As compared with this conventional method, the computer system using the switching device of the present invention is very efficient from the viewpoint of the installation cost and the installation space.

BRIEF DESCRIPTION OF THE DRAWINGS

The present invention will be more clearly understood from the description as set below with reference to the accompanying drawings, wherein:

FIG. 3 is a flowchart showing enciphering processing in a security process of the switching device according to the present invention;

FIG. 4 is a diagram for explaining the enciphering processing in the security process of the switching device according to the present invention;

FIG. 5 is a flowchart showing deciphering processing for a private computer in the security process of the switching device according to the present invention;

FIG. 10 is an outline diagram exemplifying a computer system including the switching device according to the present invention.

DESCRIPTION OF THE PREFERRED EMBODIMENTS

A switching device according to the present invention is for relaying data mainly between a terminal as an input unit like a keyboard and a pointing pad of each user, a computer (hereinafter to be referred to as a "private computer") of each user, and a specified computer. As the specified computer, there is, for example, a computer (hereinafter to be referred to as a "shared computer") that is shared among a plurality of users.

In the present specification, a description will be made of a case where a switching device according to the present invention relays data between four terminals A, B, C, and D, private computers A, B, C, and D corresponding to these terminals, and one shared computer. These numbers of terminals, private computers and the shared computer respectively are only one example, and these numbers do not limit the present invention. For example, there may be two sets of terminals and private computers.

Figure 1A:
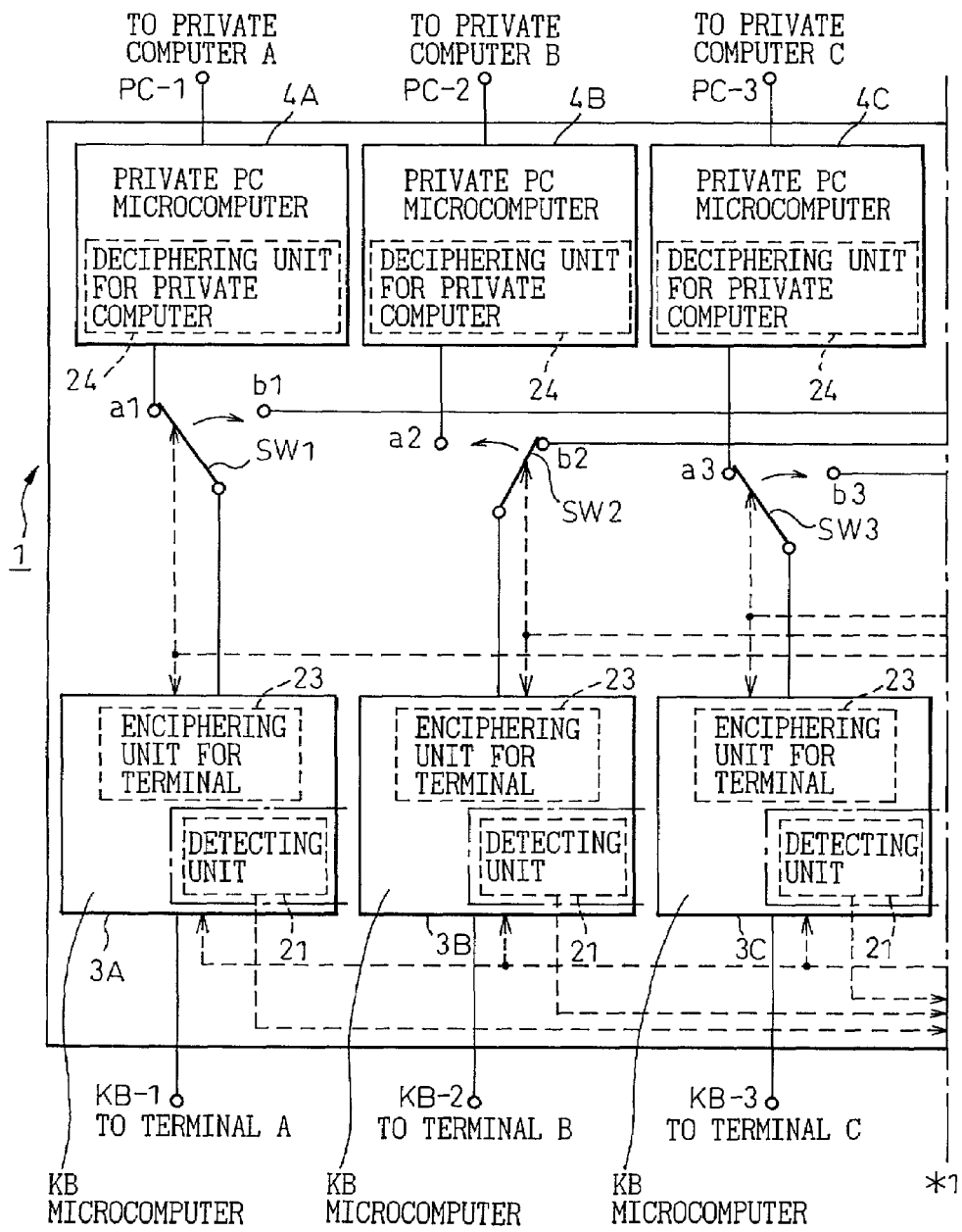
FIGS. 1a and 1b are an outline diagram exemplifying a structure of a switching device according to the present invention.
Figure 1B:
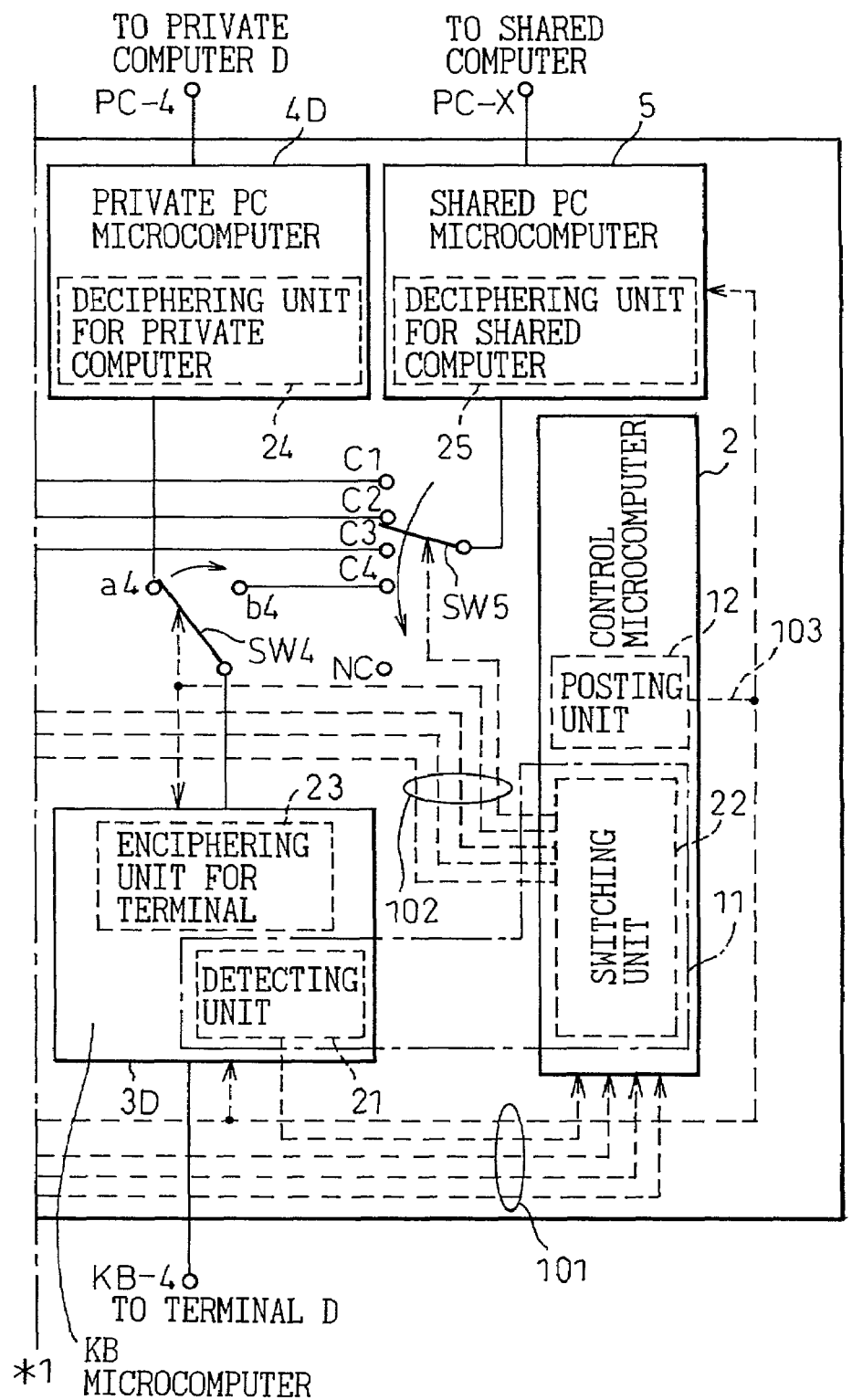

FIGS. 1a and 1b are an outline diagram exemplifying a structure of a switching device according to the present invention.

First, an example of a hardware structure of a switching device 1 according to the present invention will be explained.

As shown in FIGS. 1a and 1b, the switching device 1 of the present invention consists of a control microcomputer 2 that manages a total control of the switching device 1, KB microcomputers 3A, 3B, 3C, and 3D provided for terminals that are connected to the switching device 1, private PC microcomputers 4A, 4B, 4C, and 4D provided for private computers that are connected to the switching device 1, and a shared PC microcomputer 5 provided for a shared computer to be connected.

Each of the KB microcomputers 3A, 3B, 3C, and 3D passes only key data from the keyboard or the pointing pad as data to be input to the switching device 1, and passes only various commands from the computer as data to be output from the switching device 1.

Each of the private PC microcomputers 4A, 4B, 4C, and 4D and the shared PC microcomputer 5 passes only data from the keyboard or the pointing pad as data to be output from the switching device 1, and passes only commands from the computer as data to be input to the switching device 1.

According to the example shown in FIGS. 1a and 1b, the four sets of terminals, the corresponding private computers, and one shared computer are connected to the switching device 1 of the present invention. Therefore, the one control microcomputer 2, the four KB microcomputers 3A, 3B, 3C, and 3D, the four private PC microcomputers 4A, 4B, 4C, and 4D, and the one shared PC microcomputer 5 are provided.

The KB microcomputers 3A, 3B, 3C, and 3D are provided with connectors KB-1, KB-2, KB-3, and KB-4 for installing the terminals A, B, C, and D respectively. The private PC microcomputers 4A, 4B, 4C, and 4D are provided with connectors PC-1, PC-2, PC3, and PC-4 for installing the private computers A, B, C, and D respectively. The shared PC microcomputer 5 is provided with a connector PC-X for installing the shared computer.

As switches for switching between the microcomputers, there are provided switches SW1, SW2, SW3, SW4, and SW5 between the corresponding KB microcomputers 3A, 3B, 3C, and 3D and the private PC microcomputers 4A, 4B, 4C, and 4D respectively, as shown in FIGS. 1a and 1b.

The switches SW1, SW2, SW3, and SW4 are provided with terminals a1, a2, a3, and a4 for connecting the KB microcomputers 3A, 3B, 3C, and 3D to the corresponding private PC microcomputers 4A, 4B, 4C, and 4D respectively. Also, the switches SW1, SW2, SW3, and SW4 are provided with terminals b1, b2, b3, and b4 for connecting the KB microcomputers 3A, 3B, 3C, and 3D to the shared PC microcomputer 5 respectively.

The switch SW5 is connected to the shared PC microcomputer 5, and is provided with terminals (ports) c1, c2, c3, and c4 for connecting the shared PC microcomputer 5 to the four KB microcomputers 3A, 3B, 3C, and 3D respectively. Also, the switch SW5 is provided with a neutral port NC that does not connect the shared PC microcomputer 5 to any one of the KB microcomputers 3A, 3B, 3C, and 3D.

The default status of the switching device 1 is that each terminal is connected to a corresponding private computer. In other words, the switches SW1, SW2, SW3, and SW4 are connected to the terminals a1, a2, a3, and a4 respectively, and the switch SW5 is connected to the neutral port NC.

According to the present invention, data transmitted from a terminal, a private computer or the shared computer connected to the switching device 1, is input to the switching device 1. The data is then received by a corresponding one of the KB microcomputers 3A, 3B, 3C, and 3D, the private PC microcomputers 4A, 4B, 4C, and 4D, and the shared PC microcomputer 5. As the data transmitted from each terminal and received by the switching device 1, there are various kinds of signals, commands, key codes of the keyboard, and coordinate input data of the pointing device. As the data transmitted from each private computer or the shared computer and received by the switching device 1, there are clock signals, and data synchronous with these clock signals.

The data is received by one of the KB microcomputers 3A, 3B, 3C, and 3D, the private PC microcomputers 4A, 4B, 4C, and 4D, and the shared PC microcomputer 5. The data then passes through a necessary one of the switches SW1, SW2, SW3, and SW4, and is transmitted for output to one of the KB microcomputers 3A, 3B, 3C, and 3D, the private PC microcomputers 4A, 4B, 4C, and 4D, and the shared PC microcomputer 5. Thereafter, the data is output from the switching device 1 to a corresponding unit.

For example, where a certain key of the terminal A has been depressed, and the KB microcomputer 3A for the terminal A has received a key code of this key and when the terminal A has been connected with the private computer A, the switch SW1 has been connected to the terminal a1, and the switch SW5 has been connected to the neutral port NC, this key code is transmitted from the KB microcomputer 3A for the terminal A to the private computer 4A for the terminal A via the terminal a1 of the switch SW1. When the terminal A has been connected with the shared computer, the switch SW1 has been connected to the terminal b1, and the switch SW5 has been connected to the terminal c1. Then, the key code is transmitted from the KB microcomputer 3A to the shared PC microcomputer 5 for the shared computer via the terminal b1 of the switch SW1 and the terminal c1 of the switch SW5 respectively. A detailed operation of data transmission and reception will be explained later.

A system structure of the switching device 1 according to the present invention will be explained next.

As shown in FIGS. 1a and 1b, the switching device 1 includes: connecting unit 11 that connects each terminal to a corresponding private computer in the default status, and changes over a connection destination of a terminal to a private computer corresponding to this terminal or the shared computer when a connection switching request transmitted from this terminal has been received; enciphering unit 23 that executes an identification processing of the data that has been received from one terminal and that is to be output to the private computer or the shared computer, as security unit for each terminal, and that executes an enciphering processing for each terminal, on the data that has been transmitted from one terminal and received by the switching device 1; private computer deciphering unit 24 that executes a deciphering processing corresponding to the enciphering processing that is local to a terminal of one private computer, on the data that has been output from the switching device 1 to this private computer; shared computer deciphering unit 25 that executes a deciphering processing corresponding to the enciphering processing for a terminal currently connected to the shared computer, of the data that has been output from the switching device to the shared computer; and posting unit 12 that posts a connection status of the shared computer and each terminal to the shared computer and each terminal.

The connecting unit 11 includes detecting unit 21 and switching unit 22.

Further, as shown in FIGS. 1a and 1b, the posting unit 12 and the switching unit 22 are realized by the control microcomputer 2. The detecting unit 21 and the enciphering unit 23 are realized within the KB microcomputers 3A, 3B, 3C, and 3D respectively. The private computer deciphering unit 24 are realized within the private PC microcomputers 4A, 4B, 4C, and 4D respectively. The shared computer deciphering unit 25 is realized within the shared PC microcomputer 5.

The detecting unit 21 detects whether or not a key code of a predetermined key transmitted from any one terminal has been received in a predetermined number during a predetermined period. Then, the detecting unit 21 transmits to the control microcomputer 2 a connection switching request signal 101 that shows a request for switching a connection destination of the terminal connected to the switching device 1 to a private computer corresponding to this terminal or the shared computer. This will be described later.

The switching unit 22 transmits to any one of the switches SW1, SW2, SW3, SW4, and SW5, a command (hereinafter to be referred to as a "switching command" 102) for switching a connection destination of the terminal from which the connection switching request signal 101 has been issued to a private computer corresponding to the terminal or the shared computer, according to the connection status of the terminal and the using status of the shared computer.

The enciphering unit 23 executes an enciphering process for any one of the KB microcomputers 3A, 3B, 3C, and 3D, on the data that has been transmitted from one of the terminals A, B, C, and D and received by the corresponding one of the KB microcomputers 3A, 3B, 3C, and 3D exclusively for the corresponding one of the terminals A, B, C, and D.

The private computer deciphering unit 24 executes a deciphering process corresponding to an enciphering process for a terminal corresponding to a private computer, on the data that has been output from one of the private PC microcomputers 4A, 4B, 4C, and 4D within the switching device 1 to a corresponding private computer A, B, C, or D. In other words, a deciphering process executed by the private computer deciphering unit 24 within the private PC microcomputers 4A, 4B, 4C, and 4D corresponds to an enciphering process executed by the enciphering unit 23 within the KB microcomputers 3A, 3B, 3C, and 3D, one to one.

The shared PC microcomputer deciphering unit 25 executes a deciphering process corresponding to an enciphering process for one of the terminals A, B, C, and D currently connected to the shared computer, on the data that has been output from the shared PC microcomputer 5 within the switching device 1 to the shared computer. For example, when the terminal B has been connected with the shared computer, a deciphering process executed by the shared computer deciphering unit 25 within the shared PC microcomputer 5 corresponds to an enciphering process executed by the enciphering unit 23 within the KB microcomputer 3B.

The posting unit 12 posts a connection status of the shared computer and the terminals A, B, C, and D to the shared computer and the respective terminals as a posting signal. A reference number 103 refers to this posting signal. For example, as described later, when the shared computer is being used by having been connected to a certain terminal, information that shows that the shared computer is currently being used is posted to the terminals A, B, C, and D.

According to the present invention, a switch exclusively used for a switching operation is not provided in the switching device 1, but a predetermined key operation of the keyboard is allocated for the connection switching operation. Particularly, it is preferable that a predetermined depression operation of the Scroll Lock key is allocated for the connection switching operation for the following two reasons.

First, on the normal keyboard, LEDs exclusive for some keys are provided that are turned on or turned off based on the depression of these keys. In the present invention, the lighting and extinguishing of this LED is used as a display for informing the user about a terminal connection status. In other words, in the present invention, when the shared computer has already been connected to a certain terminal, the LED on the keyboard at each terminal is slowly flickered to indicate that the shared computer is currently being used.

Such display unit may be provided on the main body of the switching device 1. However, terminals like the keyboard, the mouse and the display are installed at a place some distance from the switching device 1 in many cases. Therefore, it is preferable that the display unit is located at a place as close to the user as possible in consideration of convenience.

The Scroll Lock key, the Num Lock key and the Caps Lock key are examples of keys on which LED's exclusive to these keys are provided on the keyboard. Among these keys, each time when the Num Lock key is depressed, a key input mode is changed over between the ten-key mode and the normal keyboard mode. An exclusive LED is lighted or extinguished each time the key is depressed. Each time the Caps Lock key is depressed, a key input mode is changed over between the capital letter alphabet mode and the small letter alphabet mode. An exclusive LED is lighted or extinguished each time the key is depressed. As explained above, the key input mode is changed when the Num Lock key and the Caps Lock key are depressed, and this causes a trouble with the intrinsic key operation on the keyboard. On the other hand, each time the Scroll Lock key is depressed, an exclusive LED (hereinafter to be referred to as a "scroll lock LED") on the keyboard is lighted or extinguished, but there is no change in the key input mode due to the depression of this key.

From the above two reasons, the Scroll Lock key is depressed for the connection switching operation.

The control microcomputer 2 always understands a connection status of the switching device based on a reception state of the connection switching request signal 101 sent from the detecting unit 21 of the KB microcomputers 3A, 3B, 3C, and 3D respectively or based on a transmission state of the switching command 102 sent from the switching unit 22 as described later.

When the Scroll Lock key on the keyboard as a terminal connected to the switching device 1 has been depressed in the state that the Scroll Lock LED is being extinguished, this Scroll Lock LED is lighted, and the key code of the Scroll Lock key is transmitted to the switching device 1. When the Scroll Lock key has been depressed again, the Scroll Lock LED is extinguished, and the key code of the Scroll Lock key is transmitted to the switching device 1. In other words, when the Scroll Lock key is depressed two times, the lighted/extinguished state of the Scroll Lock LED returns to the original state. Based on this fact, according to the present invention, when the Scroll Lock key has been depressed two times continuously, this operation is regarded as a connection switching request issued from the terminal. In order to distinguish between this operation and the normal operation of the Scroll Lock key, the depression of the Scroll Lock key two times during a predetermined period of time (for example, one second) is regarded as the connection switching operation.

A power supply to the switching device 1 is arranged as follows. The KB microcomputers 3A, 3B, 3C, and 3D, and the private PC microcomputers 4A, 4B, 4C, and 4D are supplied with power from only the corresponding private computers A, B, C, and D respectively. The shared PC microcomputer 5 is supplied with power from the shared computer. The control microcomputer 2 is supplied with power from all the private computers A, B, C, and D, and the shared computer that are connected to the switching device 1.

A terminal and a private computer are installed on the connector of one of the sets of the KB microcomputers 3A, 3B, 3C, and 3D and the private PC microcomputers 4A, 4B, 4C, and 4D. Then, information (hereinafter to be referred to as an "ID number") that shows a state that the terminal and the private computer have been connected to the connector is written into a RAM (not shown) within the corresponding one of the KB microcomputers 3A, 3B, 3C, and 3D exclusive for the installed terminal and into a RAM (not shown) within the corresponding one of the private PC microcomputers 4A, 4B, 4C, and 4D exclusive for the installed private computer. ID numbers of connectors on which terminals and private computer have not been installed are not written into RAMs.

The ID number may be one for each of the KB microcomputers 3A, 3B, 3C, and 3D. For example, ID numbers of the KB microcomputers 3A, 3B, 3C, and 3D are set to "1", "2", "3", and "4" respectively. The same ID numbers of the KB microcomputers 3A, 3B, 3C, and 3D are applied to the private PC microcomputers 4A, 4B, 4C, and 4D respectively, as the private PC microcomputers 4A, 4B, 4C, and 4D correspond to the KB microcomputers 3A, 3B, 3C, and 3D respectively.

The control microcomputer 2 monitors whether the ID numbers have been written into the RAMs of the KB microcomputers 3A, 3B, 3C, and 3D and the private PC microcomputers 4A, 4B, 4C, and 4D. As a result, the control microcomputer 2 can understand a connector on which a terminal and a private computer have been installed. Assume, for example, that a terminal has been installed on the connector KB-3 and also a private computer has been installed on the connector PC-3. Then, the ID number "3", that shows that the terminal and the private computer have been connected to the third connector is written into the RAM within the KB microcomputer 3C and the RAM within the private PC microcomputer 4C respectively. Therefore, the control microcomputer can recognize the installation status of the terminal and the private computer by referring to this ID number.

The principle of the operation of a switching processing and a security processing of the switching device according to the present invention will be explained next.

Figure 2A:
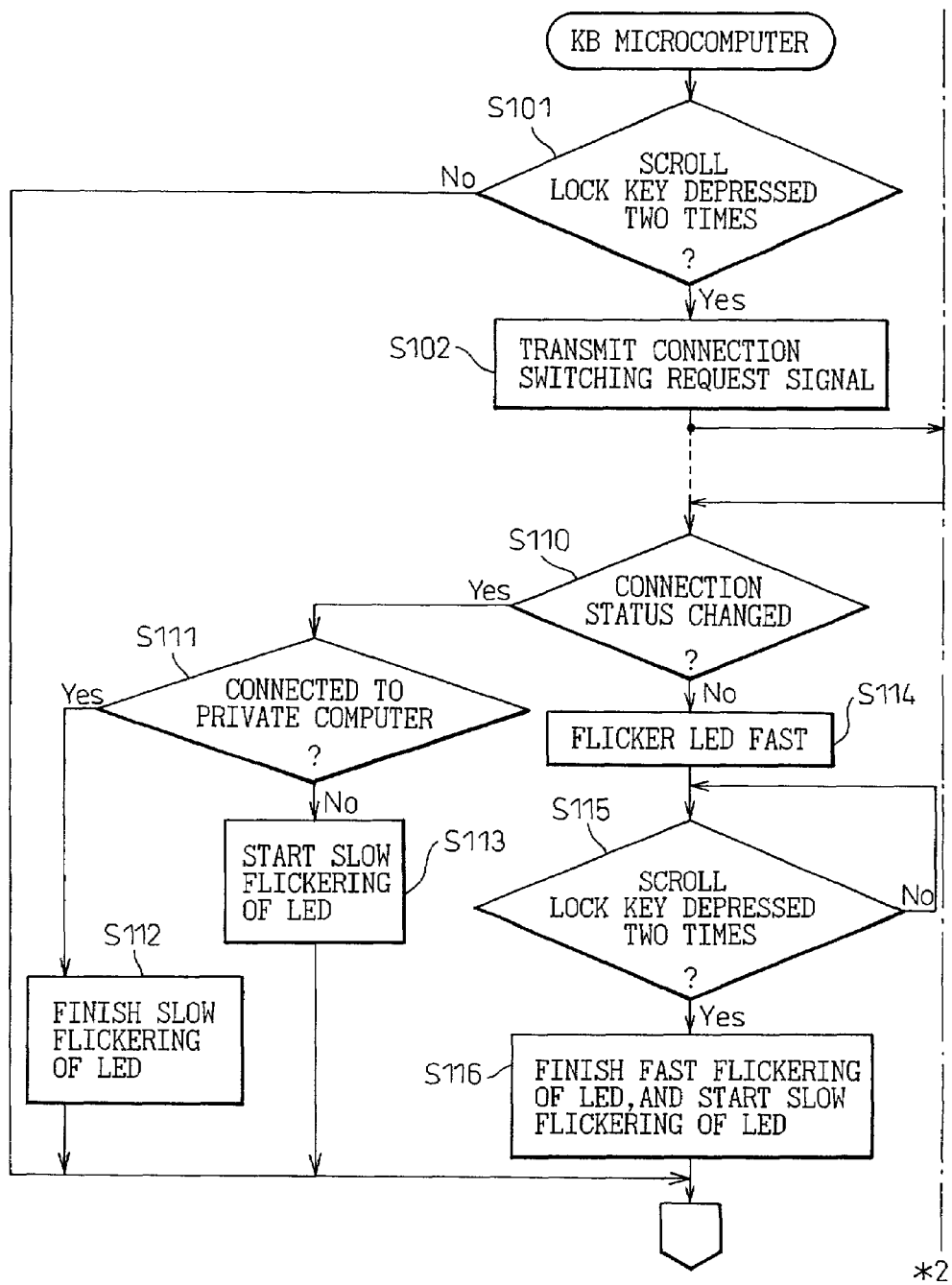
FIGS. 2a and 2b are a flowchart showing a switching processing of the switching device according to the present invention.
Figure 2B:
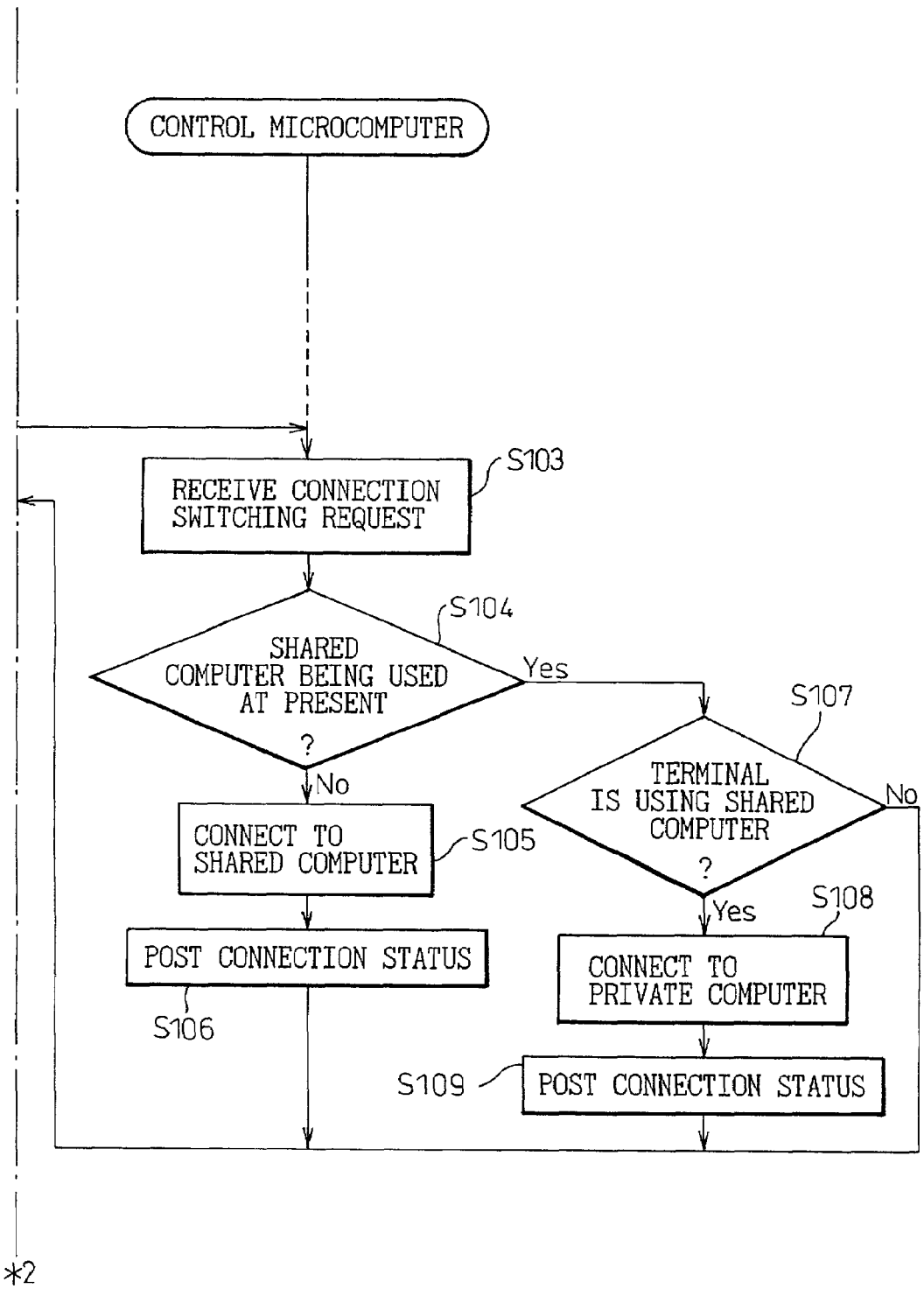

FIGS. 2a and 2b are a flowchart showing the switching processing of the switching device according to the present invention.

At step S101, the KB microcomputers 3A, 3B, 3C, and 3D shown in FIGS. 1a and 1b decide whether the Scroll Lock keys on the keyboards of the terminals A, B, C, and D installed at the connectors KB-1, KB-2, KB-3, and KB-4 have been depressed two times continuously or not. When a key code of the Scroll Lock key on the keyboard at one terminal has been received two times continuously during a predetermined period of time, the detecting unit 21 within each of the KB microcomputers 3A, 3B, 3C, and 3D decides that there has been a connection request from the terminal. Then, the process proceeds to step S102.

At step S102, the detecting unit 21 within each of the KB microcomputers 3A, 3B, 3C, and 3D that has received the key code two times continuously within the predetermined period of time transmits to the control microcomputer 2 the connection switching request signal 101 that shows that the terminal has requested the connection switching.

Next, at step S103, the control microcomputer 2 receives the connection switching request signal 101. Then, the process proceeds to step S104.

At step S104, the control microcomputer 2 decides whether the shared computer connected to the switching device 1 is currently being used or not. When the shared computer is not currently being used, the process proceeds to step S105. When the control microcomputer 2 has decided that the shared computer is being used by having already been connected to any one of the terminals A, B, C, and D, the process proceeds to step S107. The control microcomputer 2 can understand the connection status of the switching device 1 based on the reception state of the connection switching request signal 101 sent from the detecting unit 21 of the KB microcomputers 3A, 3B, 3C, and 3D respectively or based on the transmission state of the switching command 102 sent from the switching unit 22.

When the shared computer is being used by having already been connected to one terminal, the Scroll Lock LED on the keyboard at each of the terminals A, B, C, and D slowly flickers to indicate to the users that the shared computer is being used as explained before.

At step S105, the switching unit 22 within the control microcomputer 2 switches the connection destination of the terminal from which the connection switching request has been issued, to the shared computer from the corresponding private computer. The switching unit 22 within the control microcomputer 2 outputs the switching command 102. The switching command 102 is the command for switching any one necessary switch among the switches SW1, SW2, SW3, and SW4 to the shared PC microcomputer 5 and for switching the switch SW5 from the neutral port NC to any one of the terminals c1, c2, c3, and c4 corresponding to the KB microcomputer 3. Consider, for example, the switching of the connection destination of the terminal B from the private computer B to the shared computer while the shared computer is not being used. Then, the switching unit 22 outputs the switching command 102 for switching the switch SW2 from the terminal a2 to the terminal b2 and for switching the switch SW5 from the neutral port NC to the terminal c2.

Next, at step S106, the posting unit 12 within the control microcomputer 2 posts to the KB microcomputers 3A, 3B, 3C, and 3D and the shared PC microcomputer 5 respectively the posting signal 103 that shows the connection status that the connection has been switched to the shared computer. In place of this posting of the connection status, the switching command 102 may also be transmitted to the KB microcomputers 3A, 3B, 3C, and 3D at step S105.

In the mean time, when it has been decided at step S104 that the shared computer is being used by having already been connected to one terminal, the process proceeds to step S107.

At step S107, it is decided whether the terminal from which the connection switching request has been issued is the same as the terminal that is connected to the shared computer or not. When these terminals are the same, the process proceeds to step S108, and when these terminals are not the same, the process proceeds to step s110.

At step S108, the switching unit 22 within the control microcomputer 2 switches the connection destination of the terminal from which the connection switching request has been issued, to the corresponding private computer from the shared computer. The switching unit 22 within the control microcomputer 2 outputs the switching command 102. This switching command 102 is the command for switching any one necessary switch among the switches SW1, SW2, SW3, and SW4 to the private computer corresponding to this terminal, and for switching the switch SW5 from any one of the terminals c1, c2, c3, and c4 corresponding to the KB microcomputer 3A, 3B, 3C, or 3D exclusive for this terminal, to the neutral port NC. Consider, for example, the switching of the connection destination of the terminal B from the shared computer to the private computer B while the shared computer is being connected with the terminal B. Then, the switching unit 22 outputs the switching command 102 for switching the switch SW2 from the terminal b2 to the terminal a2 and for switching the switch SW5 from the terminal c2 to the neutral port NC.

Next, at step S109, the posting unit 12 within the control microcomputer 2 posts, to the KB microcomputers 3A, 3B, 3C, and 3D and to the shared PC microcomputer 5 respectively, the posting signal 103 that shows the connection status that indicates there is no connection to the shared computer. This is done in a similar manner to that of step S106.

At step S110, the KB microcomputers 3A, 3B, 3C, and 3D decide whether the connection status of the switching device 1 has changed or not as a result of the continuous depression of the Scroll Lock key by two times during a predetermined period of time. Based on the reception of the posting signal 103 from the posting unit 12 within the control microcomputer 2, the KB microcomputers 3A, 3B, 3C, and 3D can always understand the connection status of the switching device 1.

When it has been decided at step S110 that the connection status has changed, the process proceeds to step S111. In this case, based on the continuous depression of the Scroll Lock key by two times during a predetermined period of time at a certain terminal, the connection destination of this terminal has been switched from the private computer corresponding to this terminal to the shared computer, or from the shared computer to the private computer corresponding to this terminal.

At step S111, the KB microcomputers 3A, 3B, 3C, and 3D decide whether the connection status of the terminal from which the connection switching request has been issued has changed from the shared computer to the corresponding private computer or not. Based on the reception of the posting signal 103 from the posting unit 12 within the control microcomputer 2, the KB microcomputers 3A, 3B, 3C, and 3D can always understand the connection status of the switching device 1, in a similar manner to that at step S110.

When it has been decided at step S111 that the connection destination of the terminal has been switched from the shared computer to the private computer, the process proceeds to step S112.

At step S112, the slow flickering of the Scroll Lock LED on each keyboard is finished. When each of the KB microcomputers 3A, 3B, 3C, and 3D has received the posting signal 103 at step S109, each KB microcomputer stops the intermittent output of the Scroll Lock LED lighting command corresponding to the terminal A, B, C or D. As a result, the slow flickering of the Scroll Lock LED on each keyboard is finished, and the user at each terminal can visually confirm from the keyboard as an own terminal that the shared computer is not currently being used.

When it has been decided at step S111 that the connection destination of the terminal has not been switched from the shared computer to the private computer, the process proceeds to step S113. This means that the connection destination of the terminal has been switched from the private computer corresponding to the terminal to the shared computer.

At step S113, the Scroll Lock LED on the keyboard as each terminal is slowly flickered to display to each user that the shared computer is currently being used. When each of the KB microcomputers 3A, 3B, 3C, and 3D has received the posting signal 103 at step S106, a command for lighting the Scroll Lock LED is output to the corresponding terminal A, B, C, or D at predetermined time intervals. As a result, the Scroll Lock LED is slowly flickered on each keyboard.

In the mean time, when it has been decided at step S110 that the connection status has not changed, the process proceeds to step S114. This means that even when a certain user has depressed the Scroll Lock key two times continuously during a predetermined period of time at the own terminal, it is not possible to switch the connection destination to the shared computer, as the shared computer has already been connected to another terminal.

At step S114, the Scroll Lock LED flickers fast on the keyboard of the terminal from which the connection switching request has been issued. According to the present invention, when the shared computer is currently being used by having already been connected to a certain terminal, it is not possible to make further connection of a terminal. Therefore, the Scroll Lock LED flickers slowly on the keyboard at each terminal in order to display to each user that the shared computer is currently being used. Suppose, under this situation, a certain user has still depressed the Scroll Lock key two times continuously during a predetermined period of time at the user's terminal based on the user's desire for making connection to the shared computer. Then, the Scroll Lock LED of this user flickers faster than the slow flickering of the Scroll Lock LED that shows that the shared computer is currently being used, in order to post to this user that "it is not possible to switch to the shared computer".

The KB microcomputer 3 for the terminal from which the connection switching request has been issued outputs a command for lighting the Scroll Lock LED to this terminal at shorter time intervals than the time intervals of the case at step S113. Based on this operation, the Scroll Lock LED flickers fast on the keyboard of this terminal.

At step S115, the KB microcomputer 3 for the terminal from which the connection switching request has been issued decides whether the Scroll Lock key on the keyboard at this terminal has been depressed two times continuously again or not. As explained above, according to the present invention, when a user at a certain terminal still tries to connect the terminal to the shared computer despite the fact that the shared computer is in use at present, the Scroll Lock LED flickers fast on the keyboard of this terminal in order to indicate to this user that the terminal cannot be connected to the shared computer. When the user has depressed the Scroll Lock key two times again, the user reconfirms this fact consciously, and the fast flickering of the Scroll Lock LED is finished.

When it has been decided at step S115 that the Scroll Lock key on the keyboard of the terminal has been depressed two times continuously again, the process proceeds to step S116. At step S116, the Scroll Lock LED finishes the fast flickering and starts the normal slow flickering again that shows that the private computer is being used. As a result, the time interval of the command for lighting the Scroll Lock LED that the KB microcomputer 3A, 3B, 3C, or 3D for the terminal outputs to this terminal is returned from the short interval explained at step S114 to the interval explained at step S113.

As explained above, according to the switching processing of the switching device of the present invention, a user can easily carry out the switching operation by manipulating the Scroll Lock key on the keyboard. Further, the connection status of the shared computer is displayed as a flickering of the Scroll Lock LED on the keyboard at each terminal. Therefore, it is not necessary to provide new display unit. It is also easy to visually confirm the connection status.

Security processing of the switching device according to the present invention will be explained next.

The security processing of the switching device according to the present invention includes an enciphering processing, a deciphering processing for a private computer, and a deciphering processing for the shared computer.

As explained above, when a terminal and a private computer have been installed on the connector of any one of the sets of the KB microcomputers 3A, 3B, 3C, and 3D and the private PC microcomputers 4A, 4B, 4C, and 4D shown in FIGS. 1a and 1b, an ID number that shows that the terminal and the private computer have been connected to the connector is written into a RAM (not shown) within the corresponding one of the KB microcomputers 3A, 3B, 3C, and 3D and into a RAM (not shown) within the corresponding one of the private PC microcomputers 4A, 4B, 4C, and 4D. ID numbers of connectors on which terminals and private computer have not been installed are not written into RAMs. The ID number may be the one local to each of the KB microcomputers 3A, 3B, 3C, and 3D. In this case, ID numbers of the KB microcomputers 3A, 3B, 3C, and 3D are set to "1","2", "3", and "4" respectively. The ID numbers of the private PC microcomputers 4A, 4B, 4C, and 4D are the same as those of the KB microcomputers 3A, 3B, 3C, and 3D respectively.

Assume, for example, that a teminal has been installed on the connector KB-4 and also a private computer has been installed on the connector PC-4. Then, the ID number "4" that shows that the terminal and the private computer have been connected to the fourth connector is written into the RAM within the KB microcomputer 3C and the RAM within the private PC microcomputer 4C respectively.

In the present invention, the enciphering processing, the private computer deciphering processing, and the shared computer deciphering processing in the security processing are realized using these ID numbers.

When a key code is output from a terminal connected to the switching device 1 of the present invention to a private computer corresponding to the terminal or the shared computer via the switching device 1, the key code input to the switching device 1 from the terminal is enciphered, and the key code output from the switching device 1 to the private computer or the shared computer is deciphered. Coordinate input data of the pointing device is also enciphered and deciphered in a similar manner.

FIG. 3 is a flowchart showing the enciphering processing in the security processing of the switching device according to the present invention, and FIG. 4 is a diagram for explaining the enciphering processing.

The enciphering processing in the security processing of the switching device according to the present invention is carried out by the enciphering unit 23 in the KB microcomputers 3A, 3B, 3C, and 3D respectively shown in FIGS. 1a and 1b.

When a user at a certain terminal has input a key code from the keyboard at step S201, the KB microcomputer 3A, 3B, 3C, or 3D for this terminal receives the input key code at step S202.

Next, at step S203, the KB microcomputer that has received this key code obtains an ID number written into the RAM (not shown) within this KB microcomputer. For example, when the terminal has been installed on the connector KB-2, the KB microcomputer obtains the ID number "2" of the KB microcomputer 3B.

Next, at step 5204, the enciphering unit 23 within the KB microcomputer executes the enciphering processing to the received key code. The key code transmitted from the terminal to the switching device 1 has eight bits. When the ID number of the KB microcomputer 3 is n, the enciphering unit 23 according to the present invention shifts the key code by n times in the direction from the highest bit to the lowest bit, as shown in FIG. 4. Therefore, the number n of the bit shift executed by the enciphering unit 23 is local to each of the KB microcomputers 3A, 3B, 3C, and 3D. Although it is explained in the above that the bit is shifted from the highest bit to the lowest bit, the bit shift direction may be in the opposite order. Further, although the bit shifting method is used for the enciphering processing in the present invention, other enciphering processing may also be used.

Next, at step S205, the enciphering unit 23 transmits the enciphered key code to the corresponding one of the private PC microcomputers 4A, 4B, 4C, and 4D, or to the shared PC microcomputer 5.

The transmission destination of the enciphered key code is determined according to the connection status of the switches SW1, SW2, SW3, SW4, and SW5. For example, when the terminal B is being connected to the corresponding private computer B, the switch SW2 is being connected to the contact point a2. Therefore, the enciphered key code is transmitted from the KB microcomputer 3B to the private PC microcomputer 4B. Further, for example, when the terminal B is being connected to the shared computer, the switch SW2 is being connected to the connection point b2 and the switch SW5 is being connected to the contact point c2. Therefore, the enciphered key code is transmitted from the KB microcomputer 3B to the shared PC microcomputer 5.

Figure 6:
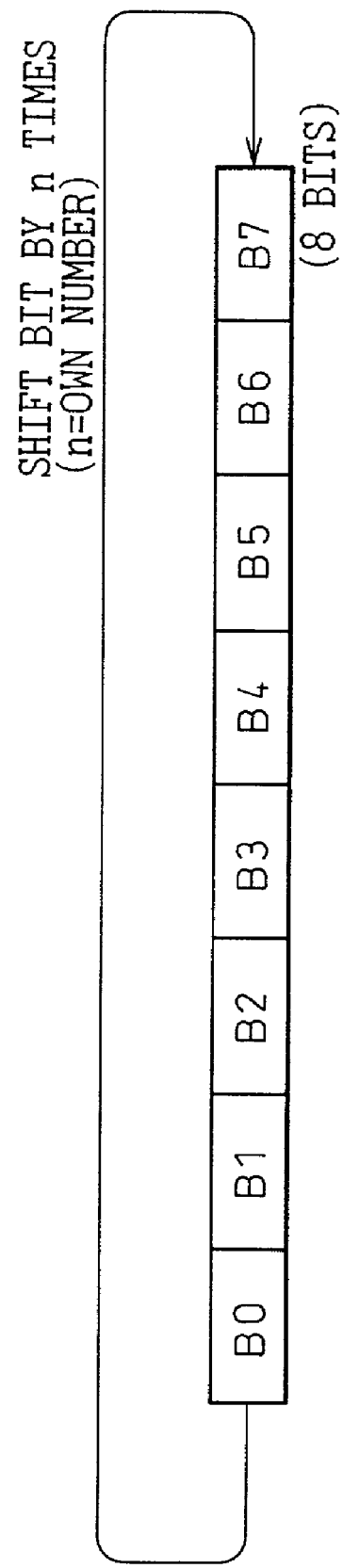
FIG. 6 is a diagram for explaining the deciphering processing in the security process of the switching device according to the present invention.

FIG. 5 is a flowchart showing a deciphering processing for a private computer in the security processing of the switching device according to the present invention, and FIG. 6 is a diagram for explaining the deciphering processing.

The deciphering processing for a private computer in the security processing of the switching device according to the present invention is carried out by the private computer deciphering unit 24 in the private PC microcomputer 4 shown in FIGS. 1a and 1b.

At step S301, the private PC microcomputer 4A, 4B, 4C, or 4D receives an enciphered key code transmitted from the corresponding one of the KB microcomputers 3A, 3B, 3C, and 3D.

Next, at step S302, the private PC microcomputer that has received this enciphered key code obtains an ID number written into the RAM (not shown) within this private PC microcomputer, in a similar manner to that explained at step S203. For example, when the terminal has been installed on the connector PC-2, the private PC microcomputer obtains the ID number "2".

Next, at step S303, the private computer deciphering unit 24 within the private PC microcomputer executes the deciphering processing to the received key code. When the ID number of the private PC microcomputer 4 is n, the private computer deciphering unit 24 according to the present invention shifts the key code by n times in the direction opposite to that for the enciphering processing, that is, in the direction from the lowest bit to the highest bit, as shown in FIG. 6. The number n of the bit shift executed by the private computer deciphering unit 24 is provided with each of the private PC microcomputers 4A, 4B, 4C, and 4D, respectively, like in the case of the enciphering unit 23 in the KB microcomputers 3A, 3B, 3C, and 3D. Further, the bit shift direction in the deciphering processing is opposite to the direction of the enciphering processing. Therefore, when the ID number of the KB microcomputer coincides with the ID number of the private PC microcomputer, the enciphered key code is normally deciphered.

In the present invention, the bit shifting method is used for the deciphering processing in order to be consistent with the enciphering processing explained with reference to FIG. 4 and FIG. 5. When other method is used for the enciphering processing, this method is also used for the deciphering processing to maintain consistency.

Next, at step S304, the private computer deciphering unit 24 transmits the deciphered key code to the corresponding private computer.

As explained above, according to the security processing of the present invention, the enciphering processing in the KB microcomputers 3A, 3B, 3C, and 3D corresponds to the private computer deciphering processing in the private PC microcomputers 4A, 4B, 4C, and 4D, respectively. Therefore, even when the switches SW1, SW2, SW3, and SW4 have been out of order, and the KB microcomputers have been connected to private PC microcomputers that do not correspond to these KB microcomputers, each KB microcomputer executes the private computer deciphering processing that does not correspond to the enciphering processing. Consequently, correct key data is not transmitted to the private computer that does not correspond to the terminal. As a result, even when important confidential data that has been input at the terminal has been transmitted to other private computer by error, the key code of this data is not correctly deciphered. Therefore, the safety of the data is secured.

For example, consider a case where the KB microcomputer 3A has been connected to the private PC microcomputer 4D by error due to some trouble. A key code from the terminal A is bit shifted one time and enciphered by the enciphering unit within the KB microcomputer 3A. This enciphered key code is bit shifted four times in the opposite direction and deciphered by the private computer deciphering unit 24 within the private PC microcomputer 4D. Namely, the key code from the terminal A is not transmitted to the private computer D based on a correct deciphering. Therefore, the data is safe.

Figure 7:
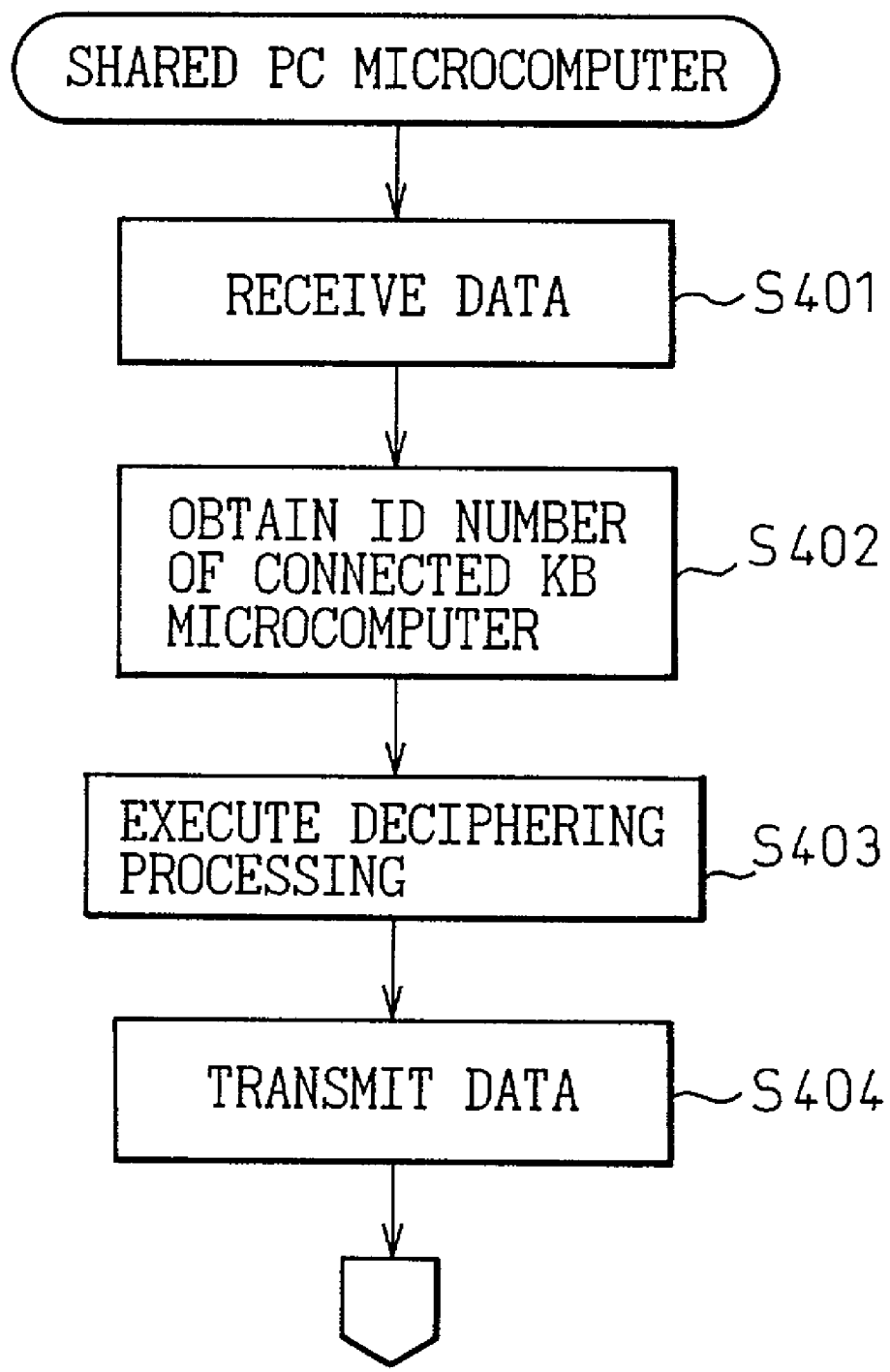
FIG. 7 is a flowchart showing a deciphering processing for a shared computer in the security process of the switching device according to the present invention.

FIG. 7 is a flowchart showing a deciphering processing for a shared computer in the security processing of the switching device according to the present invention.

The deciphering processing for a shared computer in the security processing of the switching device according to the present invention is carried out by the shared computer deciphering unit 25 in the shared PC microcomputer 5 shown in FIGS. 1a and 1b.

At step S401, the shared PC microcomputer 5 receives an enciphered key code transmitted from one of the KB microcomputers 3A, 3B, 3C, and 3D.

Next, at step S402, the shared PC microcomputer 5 that has received this enciphered key code obtains an ID number of the KB microcomputer currently connected.

As explained above, at step S106 in FIGS. 2a and 2b, for example, the posting unit 12 within the control microcomputer 2 has posted to the shared PC microcomputer 5 the current connection status of the switching device 1, that is, the connection status of the switch 5. Therefore, the shared PC microcomputer 5 understands to which KB microcomputer the shared PC microcomputer 5 is currently being connected. As a result, the shared PC microcomputer 5 can obtain the ID number of the KB microcomputer currently connected. It is understood from this fact that the ID number obtained at step S402 is different according to the KB microcomputer 3A, 3B, 3C, or 3D.

Next, at step S403, the shared computer deciphering unit 25 within the shared PC microcomputer 5 executes the deciphering processing to the key code. The shared computer deciphering unit 25 according to the present invention shifts bits of the key code n times in the direction opposite to that of the enciphering processing as explained with reference to FIG. 6, when the ID number that the shared PC microcomputer 5 has obtained at step S402 is n. As in the case of the above-described private computer deciphering processing, the shared computer deciphering processing corresponds to the enciphering processing in the KB microcomputer currently connected.

Next, at step S404, the deciphered key code is transmitted to the shared computer.

As explained above, according to the security processing of the present invention, the shared computer deciphering processing in the shared PC microcomputer 5 corresponds to the KB microcomputer enciphering processing that has been decided from the connection status of the shared PC microcomputer 5 posted by the posting unit 12 within the control microcomputer 2.

Therefore, even when the switches SW1, SW2, SW3, SW4, and SW5 have malfunctioned despite the fact that some terminal has issued a connection switching request for switching to the shared computer, the shared PC microcomputer 5 executes the shared computer deciphering processing based on the posting from the posting unit 12. As a result, a correct key code does not flow out to the shared computer.

For example, even when a user considers that the terminal is being connected to a private computer via the switching unit 1, and in fact when the terminal is being connected to the shared computer due to some trouble in the switch SW1, SW2, SW3, SW4, or SW5 within the switching device 1, any input of key data from the keyboard of the terminal is not correctly deciphered. Therefore, the security of the data is ensured.

As explained above, according to the present invention, even when a correct connection switching has not been realized due to a trouble of the switch main body within the switching device, only the data that has not been correctly deciphered is transmitted from the switching device to each computer. Therefore, the data is safe.

Next, the actual connection of the switching device according to the present invention will be explained.

Figure 8:
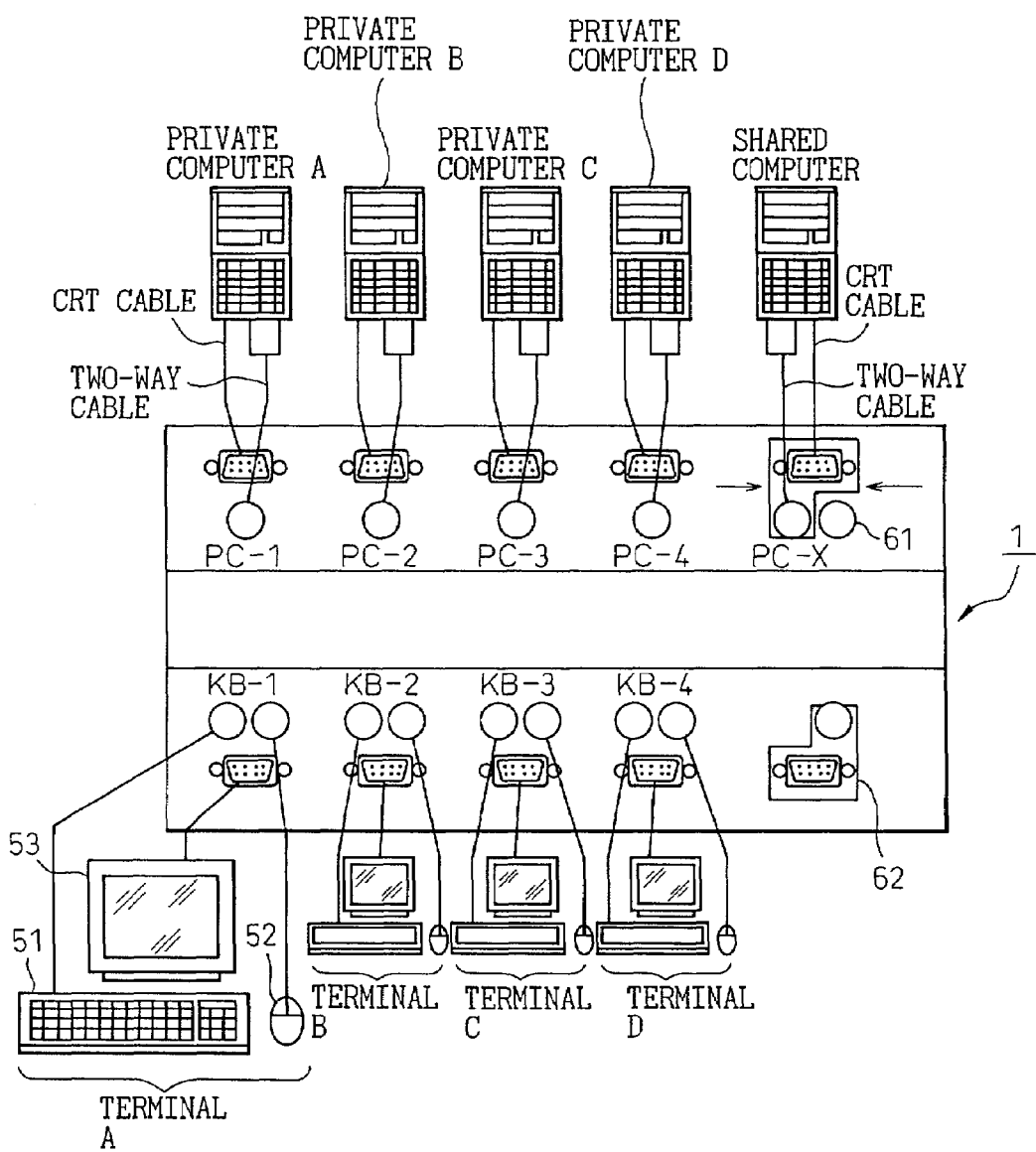
FIG. 8 is a diagram showing an example of a connection of the switching device according to the present invention.

FIG. 8 is a diagram showing an example of a connection of the switching device according to the present invention.

In FIG. 8, the switching device 1 shows a connector surface.

First, a keyboard 51, a pointing device 52, and a display 53 are connected to connectors corresponding to respective cables, for each of the four terminals A, B, C, and D. The connectors for the respective terminals correspond to the connectors KB-1, KB-2, KB-3, and KB-4 in FIGS. 1a and 1b. The socket for each connector may be based on a standard socket usually available in the market.

The keyboard that can be connected to the switching device 1 includes, for example, the English/Japanese keyboard (101 to 109 keys) of PS/2 (a registered trademark). The pointing device includes, for example, a general mouse, a wheeled mouse, and a 2/3-button mouse. The display includes VGA, SVGA, and multi-synch type displays. The units that can be connected to the switching device of the present invention are not limited to these.

Each of the four private computers A, B, C, and D, and the shared computer uses a CRT cable and a two-way cable that has some cables from the keyboard and the pointing device accommodated into the same cable. Each computer connects these cables to the connectors of the switching device 1. Connectors for the private computer and the shared computer correspond to the connectors PC-1, PC-2, PC3, and PC-4, and PC-X shown in FIGS. 1a and 1b.

Further, on the connector surface, an input connector 61 and an output connector 62 are provided for a cascade connection described later. The input connector 61 has one connector socket for connecting an expansion cable described later. The output connector 62 has a connector socket for connecting the expansion cable, and a connector socket for connecting the CRT cable.

Figure 9:
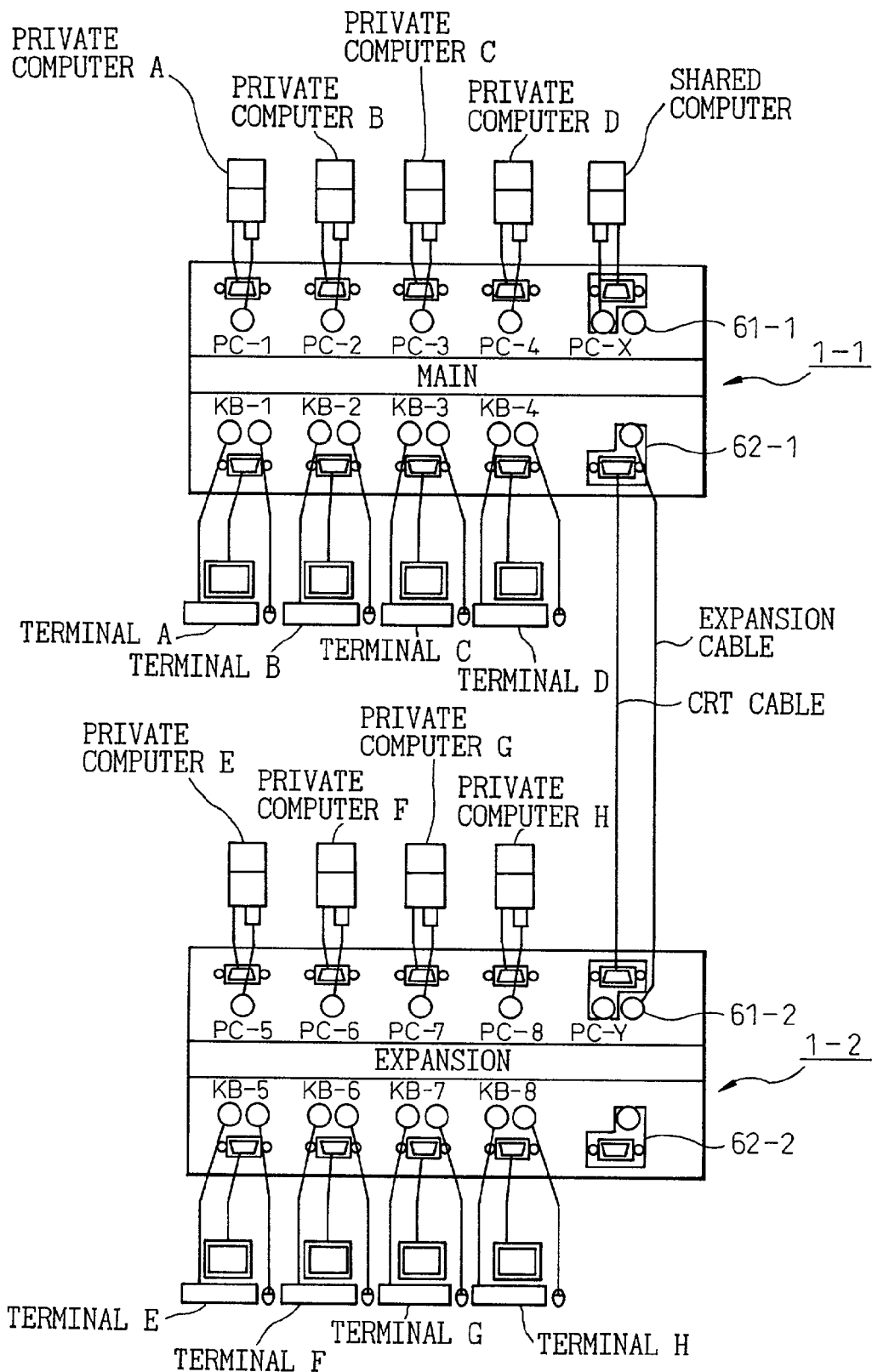
FIG. 9 is a diagram showing a cascade connection of the switching device according to the present invention.

FIG. 9 is a diagram showing a cascade connection of the switching device according to the present invention.

In this drawing, the switching device shows a connector surface like that shown in FIG. 8. FIG. 9 shows an example that a switching device 1-2 at an expansion side is connected in cascade with a main switching device 1-1.

Based on a cascade connection of the two switching devices, it is possible to install maximum eight sets of terminals and private computers A to H. It is also possible to connect in cascade a larger number of switching devices. In this case, each time when one switching device is connected in cascade, four sets of terminals and private computers can be connected additionally.

The shared computer is connected to the main switching device 1-1 and the connector PC-X using the CRT cable and the two-way cable, as the case shown in FIG. 8.

In order to connect in cascade the main switching device 1-1 and the switching device 1-2 at the expansion side, an expansion cable is connected between an input connector 61-2 of the switching device 1-2 and an output connector 62-1 of the switching device 1-1. Further, a CRT cable is connected between a connector socket of a connector PC-Y for the shared computer of the switching device 1-2 and an output connector 62-1 of the switching device 1-1.

Next, the operation of a cascade-connected switching device will be explained. The switching processing and the security processing within the switching devices 1-1 and 1-2 are the same as that described above. A tied operation of the main switching device 1-1 and the switching device 1-2 at the expansion side will be explained below.

First, consider a case where a terminal connected to the switching device 1-2 at the expansion side is switched from the corresponding private computer to the shared computer. The switching device 1-2 executes the above-described switching operation by regarding the main switching device 1-1 as the shared computer, and various signals are transmitted to the switching device 1-1 via the expansion cable. On the other hand, the switching device 1-1 executes the above-described switching processing by regarding the switching device 1-2 as a fifth terminal. In this case, the ID number of the switching device 1-2 at the expansion side to the main switching device 1-1 is set to "5", for example.

Next, consider a case where a key code is transmitted from the terminal connected to the switching device 1-2 to the shared computer. The switching device 1-2 executes the above-described security operation by regarding the main switching device 1-1 as the shared computer, and the key code is transmitted to the switching device 1-1 via the expansion cable. On the other hand, the switching device 1-1 executes the above-described security processing by regarding the switching device 1-2 as a fifth terminal, and outputs the key code to the shared computer. In the security processing of the switching device 1-1, the number of the bit shift is set to "5", for example.

A command to be transmitted from the shared computer to any one of the terminals E, F, G, and H connected to the switching device 1-2 at the expansion side is transferred via the expansion cable.

An example of the utilization of the switching device according to the present invention will be explained next.

As described above, the switching device according to the present invention is for relaying data mainly between the terminal of each user, a computer corresponding to the terminal (for example, a private computer), and a certain specific computer (for example, a shared computer shared by a plurality of users).

FIG. 10 is an outline diagram exemplifying a computer system including the switching device according to the present invention.

In the example shown in this drawing, computers A, B, C, and D, and a computer X are connected to different networks. It is easy to differentiate the use of computers to be connected to the two different networks, with the switching device 1 according to the present invention. Particularly, when the computers A, B, C, and D are connected to an intranet within a company, and the computer X is connected to the Internet, it is possible to securely differentiate the use of the two networks. Even when a switch within the switching device is out of order, and important input data has passed out to the Internet by error, for example, a key code is not deciphered correctly. Therefore, correct information does not leak out. From this viewpoint, the switching device according to the present invention is particularly useful in the case of relaying data between computers connected to the network.

As explained above, according to the present invention, in the switching device for relaying data between a terminal of each user, a computer corresponding to each terminal, and a certain specific computer, a microcomputer exclusive for each terminal and for each computer is individually provided in addition to a control microcomputer. Based on this arrangement, the exclusive microcomputers execute the security processing to the data input to or output from the switching device. Therefore, even when the switch main body within the switching device is out of order, and the data input from a terminal has passed out to an undesired computer, this data is not correct data. As a result, the correct data is kept safe at a high level.

Further, the security processing according to the present invention includes an enciphering processing in a microcomputer for a terminal, a first deciphering processing in a microcomputer for a computer corresponding to the terminal, and a second deciphering processing in a microcomputer for a specific computer. As other security processing, there may be added identification information to the data that is input to the switching device. For the data to be output from the switching device, a decision may be made whether it is possible to output this data or not, based on this identification information.

Further, the security processing may also be executed to the data that is transferred from each computer to a terminal via the switching device, in addition to the security processing to the data that is input from a terminal and output to one computer via the switching device.

According to the switching processing of the switching device in the present invention, a user can easily operate the switching operation by manipulating a predetermined key (for example, the Scroll Lock key) on the keyboard of the terminal.

Further, as the connection status of the shared computer is displayed by flickering an LED exclusive for a predetermined key (for example, the LED for the Scroll Lock key) on the keyboard of each terminal, it is not necessary to provide new display unit. This also facilitates the visual confirmation.

When the switching device of the present invention is used for relaying the computers connected to a network as represented by the Internet or the Intranet, it is easy to differentiate the use of the computers by operating the switching device. Moreover, even when a switch within the switching device is out of order, and important input data has passed out to the Internet by error, for example, the key code is not correctly deciphered as explained above. Consequently, correct information does not leak out. As a result, the data is very safe. Therefor, this method is very useful. For example, according to the conventional example, a private computer and a network have been prepared for each user, thereby to secure the security. However, in comparison with this method, a computer system utilizing the switching device of the present invention is very efficient from the viewpoint of the installation cost and the installation space.

What is claimed is:

1. A switching device for controlling a connection between at least one private computer, at least one terminal corresponding to the at least one private computer, and a shared computer that can be operated by the at least one terminal, the switching device comprising:

a connecting unit that connects in a default position each terminal to a corresponding private computer and switches a connection destination of the terminal to the at least one private computer corresponding to the at least one terminal or the shared computer when a connection switching request transmitted from the at least one terminal has been received; and a security unit that executes, for each terminal, identification processing of data that has been received from any one terminal and output to the at least one private computer or the shared computer, said the identification processing including utilizing a terminal number via which the at least one terminal is connected, the identification processing enciphering a received key code via use of the terminal number as an encryption key, wherein the security unit comprises:

an enciphering unit that executes an enciphering processing local to each terminal, of data that has been transmitted from any one terminal and received by the switching device;

a first deciphering unit that executes a deciphering processing corresponding to the enciphering processing local to the at least one terminal corresponding to the at least one private computer, of the data that has been output from the switching device to any one private computer; and a second deciphering unit that executes a deciphering processing corresponding to the enciphering processing local to the at least one terminal currently connected to the shared computer, of the data that has been output from the switching device to the shared computer, wherein the enciphering unit bit shifts the received data to a first direction between a highest bit and a lowest bit by only each terminal number, the first deciphering unit bit shifts an output data to a second direction opposite to the first direction by the terminal number corresponding to the at least one private computer, and the second deciphering unit bit shifts the output data to a second direction opposite to the first direction by the terminal number of a terminal currently connected to the shared computer.

2. A switching method for a switching device controlling a connection between at least one private computer, at least one terminal corresponding to the at least one private computer, and a shared computer that can be operated by the at least one terminal, the switching method comprising:
- connecting in a default position each terminal to a corresponding private computer and a connection destination of the at least one terminal is switched to a private computer corresponding to the at least one terminal or the shared computer when a connection switching request transmitted from the at least one terminal has been received; and
- identification processing for each terminal executed on data that has been received from any one terminal and output to the at least one private computer or the shared computer, the identification processing including utilizing a terminal number via which the at least one terminal is connected, the identification processing enciphering a received key code via use of the terminal number as an encryption key,
- wherein a security comprises:
  - enciphering processing of each terminal executed on the data that has been transmitted from any one terminal and received by the switching device;
  - deciphering processing corresponding to the enciphering processing of the at least one terminal corresponding to the at least one private computer executed of the data that has been output from the switching device to any one private computer; and
  - deciphering processing corresponding to the enciphering processing of the at least one terminal currently connected to the shared computer executed for data that has been output from the switching device to the shared computer,
- wherein during the enciphering processing, the received data is bit shifted to a first direction between a highest bit and a lowest bit by only each terminal number,
- during the first deciphering processing, an output data is bit shifted to a second direction opposite to the first direction by the terminal number corresponding to the at least one private computer, and
- during the second deciphering processing, the output data is bit shifted to a second direction opposite to the first direction by the terminal number of a terminal currently connected to the shared computer.

3. A computer system comprising:
- at least one private computer;
- at least one terminal corresponding to the at least one private computer;
- at least one shared computer connected to a network; and
- a switching device disposed between the at least one private computer and the at least one terminal, for relaying data between the at least one terminal and the at least one shared computer, the switching device comprising:
  - a connecting unit that connects in a default position each terminal to a corresponding private computer and switches a connection destination of the at least one terminal to a private computer corresponding to the at least one terminal or the at least one shared computer when a connection switching request transmitted from the at least one terminal has been received; and
  - a security unit that executes, for each terminal, identification processing on the data that has been received from any one terminal and output to the at least one private computer or the at least one shared computer, the identification processing including utilizing a terminal number via which the at least one terminal is connected, the identification processing enciphering a received key code via use of the terminal number as an encryption key, the security unit comprising:
    - an enciphering unit that executes an enciphering processing of each terminal, on the data that has been transmitted from any one terminal and received by the switching device, the enciphering unit for bit shifting the received data in a first direction between a highest bit and a lowest bit by each terminal number;
    - a first deciphering unit that executes a deciphering processing corresponding to the enciphering processing of the at least one terminal corresponding to the at least one private computer, on the data that has been output from the switching device to any one private computer, the first deciphering unit for bit shifting the output data to a second direction opposite to the first direction by the terminal number corresponding to the at least one private computer; and
    - a second deciphering unit that executes a deciphering processing corresponding to the enciphering processing of the at least one terminal currently connected to the at least one shared computer, on data that has been output from the switching device to the at least one shared computer, the second deciphering unit for bit shifting output data to a second direction opposite to the first direction by the terminal number of a terminal currently connected to the at least one private computer.

4. The computer system according to claim 3, wherein the at least one shared computer is connected to a second network independent of the network.

5. The computer system according to claim 4, wherein the second network is an intranet.

6. The computer system according to claim 3, wherein the network is the Internet.

* * * * *

UNITED STATES PATENT AND TRADEMARK OFFICE
CERTIFICATE OF CORRECTION

PATENT NO. : 7,464,261 B2
APPLICATION NO. : 09/878336
DATED : December 9, 2008
INVENTOR(S) : Fujio Seki et al.

It is certified that error appears in the above-identified patent and that said Letters Patent is hereby corrected as shown below:

Title Page, Column 2 Item [57] (Abstract), Line 4, change "status," to --status--.

Signed and Sealed this

Thirty-first Day of March, 2009

JOHN DOLL
*Acting Director of the United States Patent and Trademark Office*